(12) United States Patent
Cheng et al.

(10) Patent No.: US 9,164,550 B2
(45) Date of Patent: Oct. 20, 2015

(54) PORTABLE ELECTRONIC DEVICE PORT COVER

(75) Inventors: Sandie Ning Ning Cheng, Cypress, TX (US); Sana Syeda Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 13/594,632

(22) Filed: Aug. 24, 2012

(65) Prior Publication Data

US 2014/0053375 A1 Feb. 27, 2014

(51) Int. Cl.
*G06F 1/00* (2006.01)
*G06F 1/16* (2006.01)

(52) U.S. Cl.
CPC ............... *G06F 1/1656* (2013.01); *Y10T 24/33* (2015.01); *Y10T 24/47* (2015.01)

(58) Field of Classification Search
CPC ..................................................... B65D 63/109
USPC .................. 206/805; 24/17 B; 455/575.8
See application file for complete search history.

(56) References Cited

U.S. PATENT DOCUMENTS

| 308,942 | A | * | 12/1884 | Yewell | 281/37 |
| 4,041,892 | A | * | 8/1977 | Nichols | 116/239 |
| 5,459,905 | A | * | 10/1995 | Voyre | 24/17 B |
| 8,485,380 | B1 | * | 7/2013 | Abrams | 220/212 |
| 2012/0018266 | A1 | | 1/2012 | Ziv et al. | |

FOREIGN PATENT DOCUMENTS

GB 2463712 A 3/2010

OTHER PUBLICATIONS

"Silicone Phone Case for iPhone, iPhone4, and Other Brands"; http://www.tootoo.com/show/pro_photo.php?pid=1725572, May 20, 2012.

* cited by examiner

*Primary Examiner* — Jack W Lavinder
(74) *Attorney, Agent, or Firm* — HP Legal Department

(57) ABSTRACT

A portable electronic device port cover. In a first implementation multiple bands can be connected with adhesive in areas where there are no ports in a portable electronic device. In a second implementation the elastic band has a slit that aligns with the ports on the portable electronic device.

10 Claims, 5 Drawing Sheets

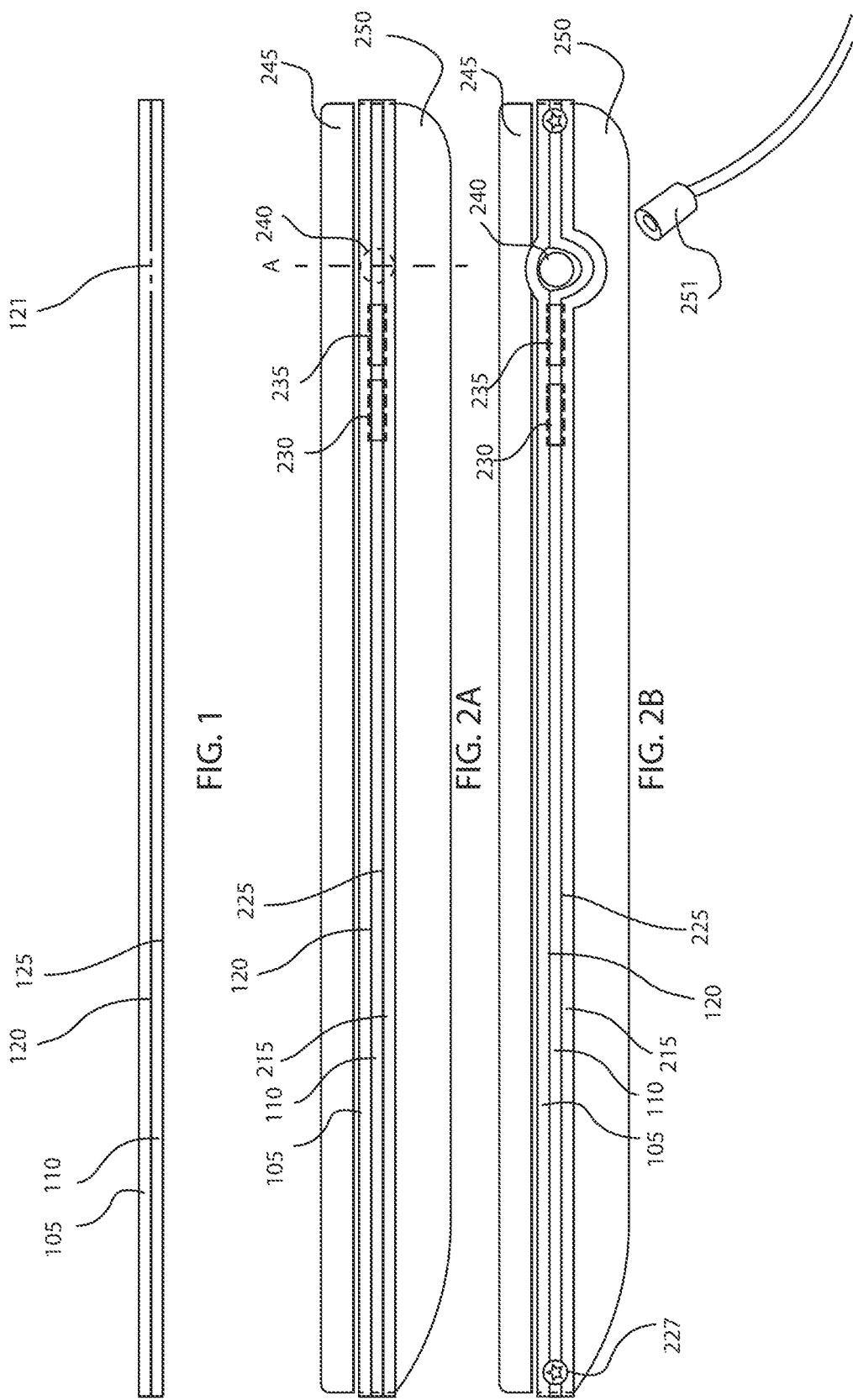

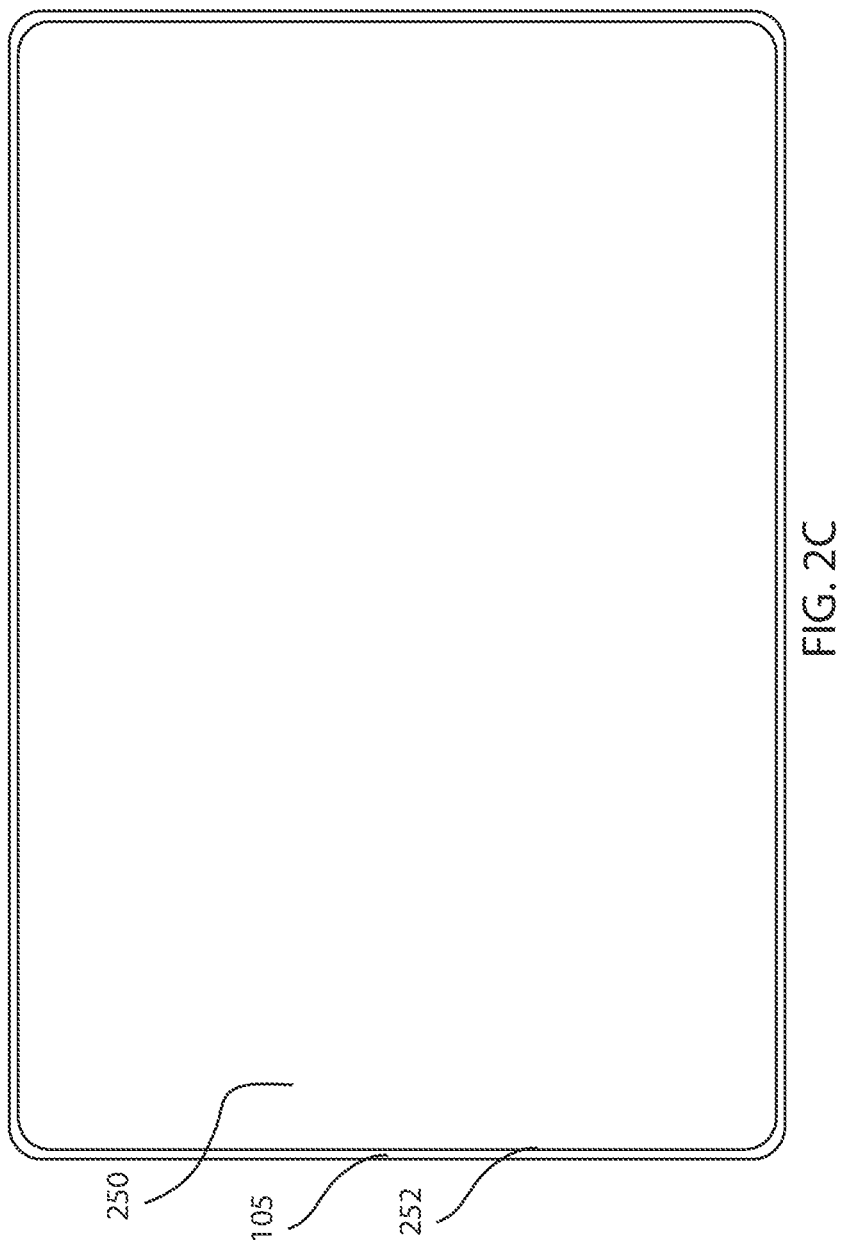

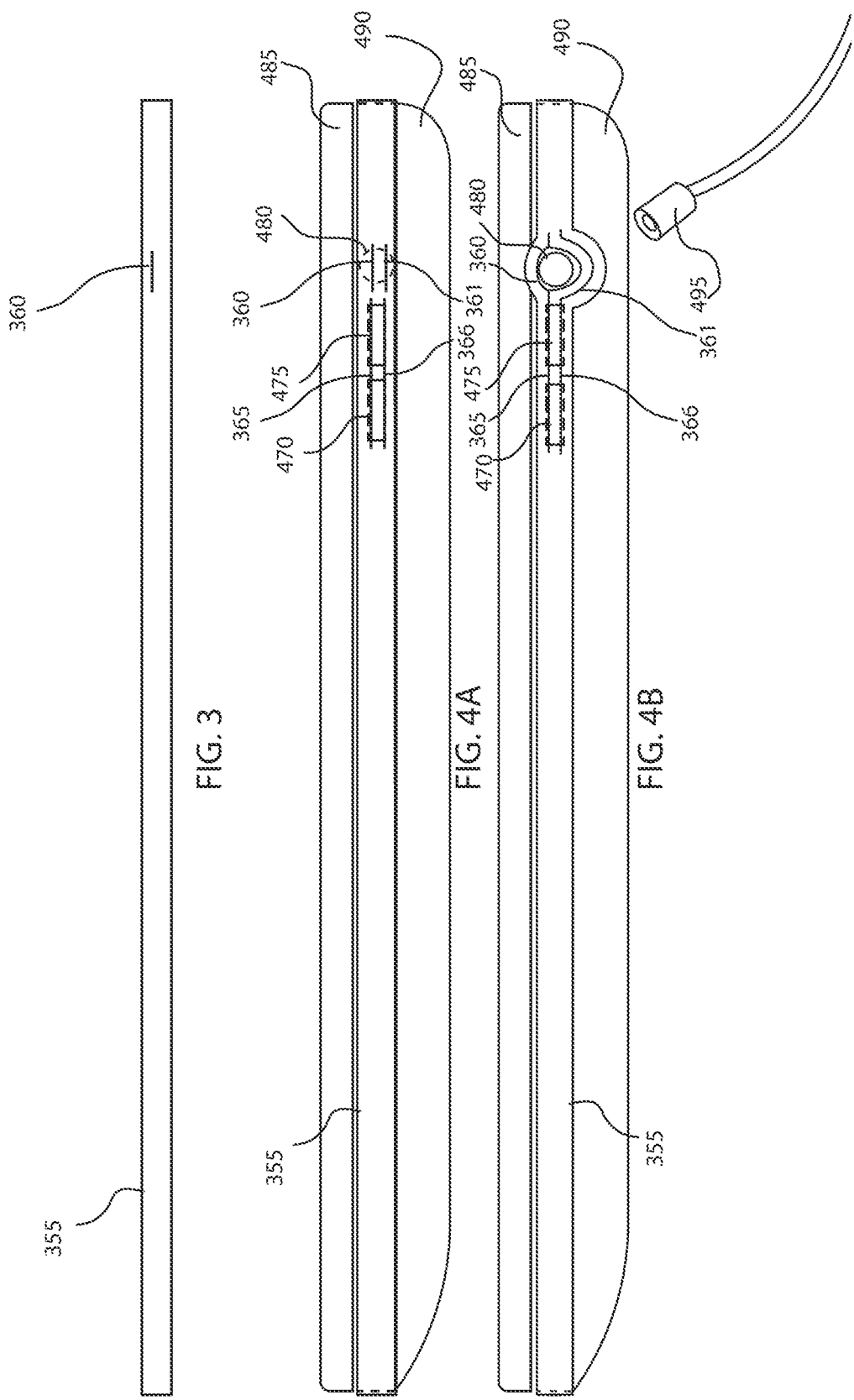

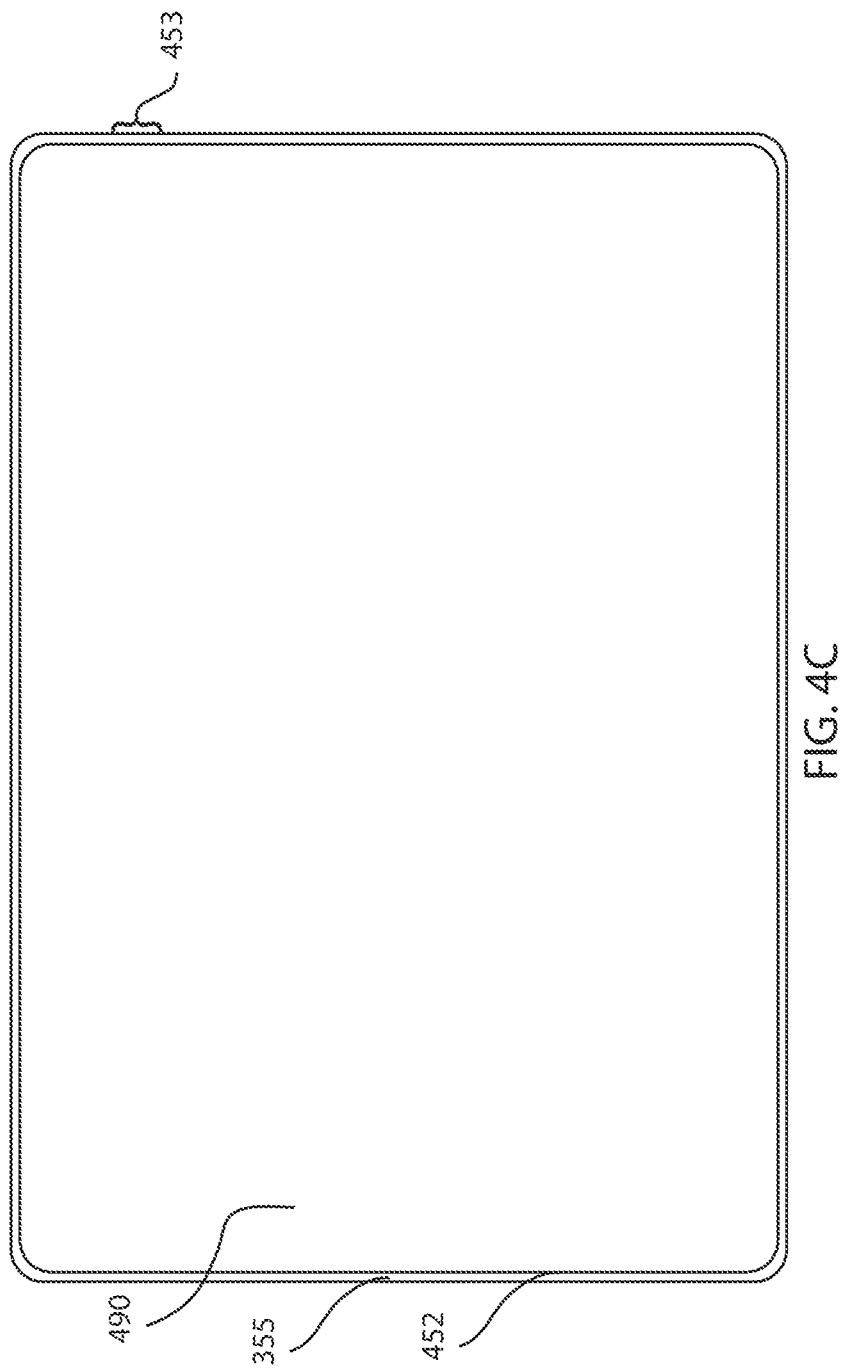

PORTABLE ELECTRONIC DEVICE PORT COVER

BACKGROUND

Portable devices may be susceptible to damage from being moved to other locations or being used in environments that provide less than optimal conditions. For example computers may get dust, dirt or other contaminates in the ports. The computers may also be involved in vibration or shock that can damage the computer such as dropping the computer.

BRIEF DESCRIPTION OF THE DRAWINGS

Some embodiments of the invention are described with respect to the following figures:

FIG. 1 is a portable electronic device port cover according to an example implementation;

FIGS. 2A-2C illustrate a portable electronic device port cover according to example implementations;

FIG. 3 is a portable electronic device port cover according to an example implementation; and FIGS. 4A-4C illustrate a portable electronic device port cover according to example implementation.

DETAILED DESCRIPTION

Figure 2D:
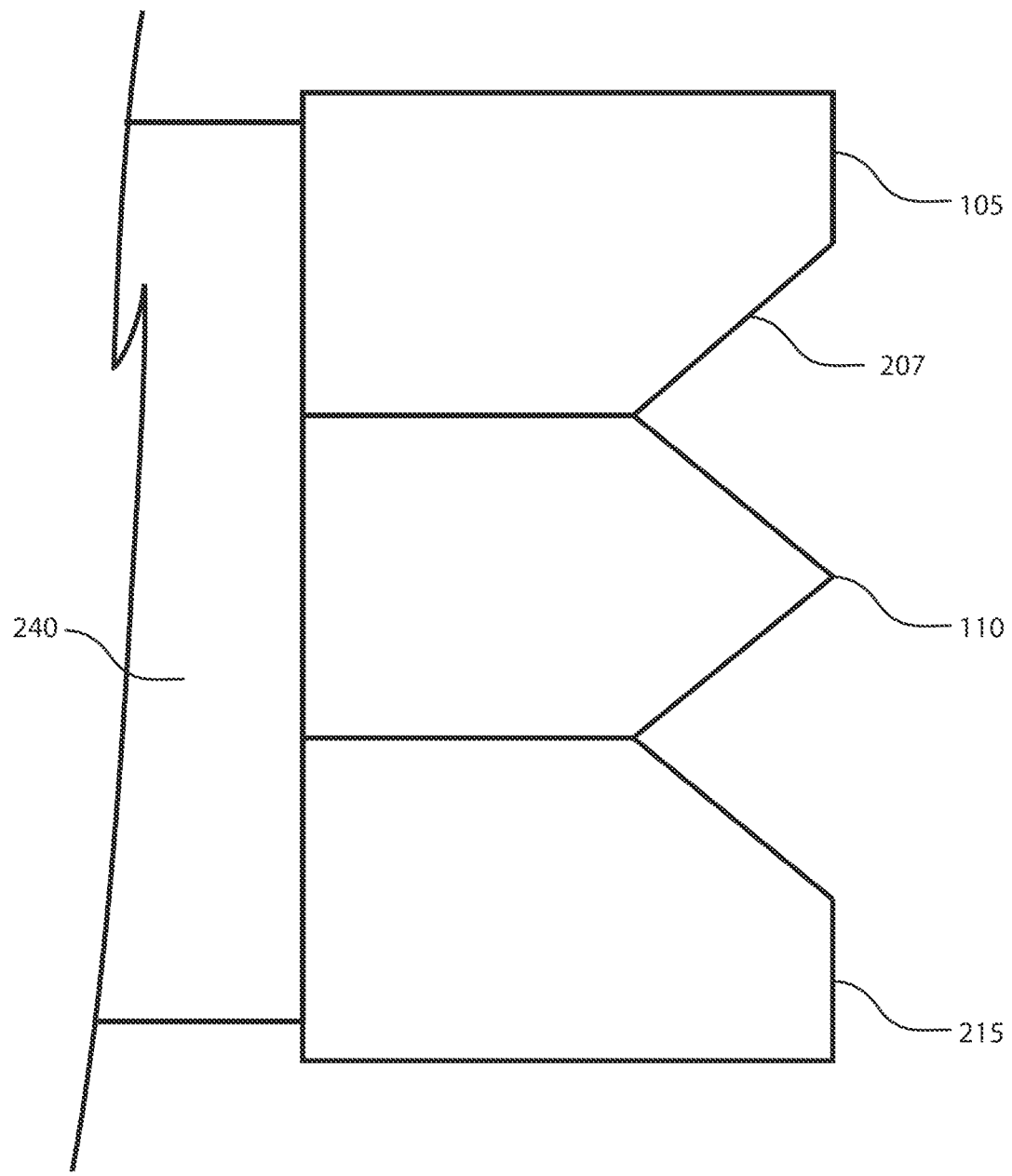
FIG. 2D is a cross section of the elastic bands in FIG. 2A according to an example implementation.

A portable electronic device can have a case that reduces the shock or vibration of the portable electronic device and covers the ports. To protect the portable electronic device the case should be able to remain on the device even when the ports are connected to. If the case is removed to access the ports the portable electronic device is susceptible to shock that could damage the portable electronic device while the case is removed.

To access the ports of the portable electronic device. The case can have access points that align with the ports of the portable electronic device when the case is installed on the portable electronic device. An access point can be a slit in the case. The case can be made of an elastic material that can be deformed to provide access to the ports to connect a connector, and when the connector is removed from the port the elastic material returns to its original form.

In one implementation, a portable electronic device port cover includes a first and a second elastic band connected adjacent to each other. An adhesive connects an adjacent portion of the first and the second elastic band to cover a portion of a portable electronic device where there are no ports. No adhesive is applied where the first and second elastic band would cover a port of the portable electronic device.

In another implementation, a portable electronic device port cover includes an elastic band. A first slit in the elastic band aligns with a port on a portable electronic device. A portion of the elastic band without the slit attaches to the portable electronic device where there are no ports.

With reference to the figures, FIG. 1 is a portable electronic device port cover according to an example implementation. The portable electronic device port cover includes a first elastic band 105 and a second elastic band 110. The first elastic band 105 and the second elastic band 110 can be connected adjacent to each other. The first elastic band and the second elastic band can have a circumference that allows the first and second elastic bands to be stretched from their resting circumference when applied around a perimeter or shape of a portable electronic device. For example the first and the second elastic bands may have a circumference of 100 centimeters at rest but when installed on the portable electronic device may be stretched to the size of the portable electronic device such as 110 centimeters. The portable electronic device may be a for example a phone, a personal digital assistant (PDA), a tablet, a notebooks or another portable electronic device. In some implementations the elastic band does not form a complete loop.

An adhesive layer 120 can connect an adjacent portion of the first and the second elastic band together to cover a portion of a portable electronic device where there are no ports. Examples of adhesives that may be used are contact adhesives and pressure sensitive adhesives.

An adhesive layer 120 can be discontinuous between the first and the second elastic band. For example the non-adhesive section 121 shown as a dotted line of the adhesive layer 120 does not have adhesive connecting the first elastic band to the second elastic band. The non-adhesive section 121 allows a connector to fit between the first elastic band 105 and the second elastic bands 110 if at least one of the first and the second elastic bands are deformed from their resting state. The non-adhesive section 121 between the first elastic band 105 and the second elastic band 110 is where the first elastic band 105 and the second elastic band would cover a port of the portable electronic device.

FIGS. 2A-2C are of a portable electronic device port cover according to an example implementation. FIG. 2A is a portable electronic device including a bottom 250 and a top 245. The portable electronic device can include a port 240, a second port 235 and a third port 230. At least one of the elastic bands may include a marking to indicate the shape, type or location of the ports on the portable electronic device behind the elastic bands such as a USB (universal serial bus) logo on the elastic bands or a dotted outline of the port. The portable electronic device may include more or less ports. A connector 251 can be connected to the port 240. To connect the connector 251 to the port 240 the connector 251 is pressed toward the area 121 between the first elastic band 105 and the second elastic band 110. The connector 251 can then be used to urge either or both of the first and second bands out of the way of the port.

In one embodiment a third elastic band 215 is connected adjacent to the second elastic band 110. A second adhesive layer 225 can be between the second elastic band 110 and the third elastic band 215. Additional bands may make it easier to insert a connector between the bands. If the ports on the computer are not in line then additional bands may make it easier to insert a connector between the first and the second band for a port and between the second band and the third band for another port.

In one embodiment, the adhesive layer 225 between the second elastic band and the third elastic band 215 is not aligned with the adhesive layer 120 between the first elastic band 105 and the second elastic band 110. Alternatively, the adhesive layer 225 between the second elastic band 110 and the third elastic band 215 is aligned with the adhesive layer 120 between the first elastic band 105 and the second elastic band 110.

The elastic band may be on a portion of the portable electronic device such as one side or a portion of one side or may be a band that surrounds the portable electronic device. To attach the first elastic band 105 and the second elastic band 110 to a portable electronic device a fastener 227 can be used. The fastener 227 can be a screw such as a Philips, torx, star or another type of screw or rivet. Alternatively a protrusion or post can be extending from the portable electronic device to be inserted into a receiving portion of the bands. The receiving portion is designed to receive the fastener such as a hole to allow the screw to pass through the band. The fastener may be a protrusion extending from the bands and inserted in the receiving portion of the portable electronic device. The fastener may also be any other fastener.

FIG. 2C is a bottom view of the portable electronic device 250. The first elastic band 105 surrounds the portable electronic device 250 but could be on just a portion of the portable electronic device 250. An adhesive layer 252 can be on a second portion of the first elastic band to attach to a portable electronic device to hold the first elastic band to the portable electronic device. The second portion of the first elastic band 105 can be between the first elastic band 105 and the portable electronic device 250. The elastic band 105 can be in a loop around the portable electronic device. The elastic bands may be different colors, textures or materials to allow customization of the portable electronic device.

FIG. 2D is a cross section of the elastic bands across A in FIG. 2A according to an example implementation. At least one of the first elastic band 105, the second elastic band 110 and the third elastic band 215 have a tapered side 207 to urge the first or second elastic band out of the way of the port 240 as the connector is inserted.

FIG. 3 is a portable electronic device port cover according to an example implementation. The portable electronic device port cover can include an elastic band 355. A first slit 360 to align with a port on a portable electronic device. The elastic band 355 without the slit attaches to the portable electronic device where there are no ports.

FIGS. 4A-4C are of a portable electronic device port cover according to an example implementation. The elastic band 355 is shown on a portable electronic device that has a bottom 490 and a top 485. The portable electronic device can include ports 480, 475 and 470 shown as dotted lines as they are not visible when the elastic band 355 is connected to the portable electronic device.

In one embodiment the slit 360 is parallel and adjacent to a second slit 361. The elastic band 355 may include multiple slits; each slit may align with a port on the portable electronic device. For example FIG. 4A and 4B show multiple slits 360, 361, 365, and 366 in the elastic band 355.

An adhesive may be used to attach the elastic band 355 to a portable electronic device similar to the adhesive 252 in FIG. 2C. In FIG. 4C, the adhesive layer 452 is absent where the slit is located, for example the non-adhesive portion 453 of the adhesive layer 452 is located where the slit 360 is located in the elastic band 355.

A fastener may be used to attach the elastic band 355 to the portable electronic device. The fastener is not adjacent to the port 360 when the elastic band 355 is attached to the portable electronic device 490.

The elastic band 355 may be in a loop. The elastic band 355 can be under tension when attached to a portable electronic device 490. The tension may be generated by stretching the elastic band 355 around the portable electronic device 490. The elastic band 355 may be made of rubber, silicone, or another flexible resilient material.

The slit 360 can be at least long enough to allow a connector such as connector 495 to be inserted in the slit 360 and connect to a port 480 on the portable electronic device 490 when the elastic band 355 is attached to the portable electronic device 490.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A portable electronic device port cover comprising:
    a first elastic band and a second elastic band adjacent to each other, at least one of the first elastic band and the second elastic band to at least partially cover a port on a portable electronic device, wherein the at least one of the first elastic band and the second elastic band includes a feature to indicate a location of the port on the portable electronic device;
    an adhesive layer to attach the first elastic band and the second elastic band to the portable electronic device;
    wherein at least one of the first elastic band and the second elastic band is detachable to stretch away from the port on the portable electronic device to allow a connector to be selectively inserted into the port; and
    wherein the feature is at least one of a marking or a slit.

2. The portable electronic device port cover of claim 1, wherein:
    the adhesive layer connects an adjacent portion of the first elastic band and the second elastic band to cover a portion of the portable electronic device where the first elastic band and the second elastic band do not cover the port of the portable electronic device; and
    the adhesive layer is not included between the first elastic band and the second elastic band in a portion of the first elastic band and the second elastic band that at least partially covers the port of the portable electronic device.

3. The portable electronic device port cover of claim 2, further comprising a third elastic band connected adjacent to the second elastic band.

4. The portable electronic device port cover of claim 3, further comprising a second adhesive layer between the second elastic band and the third elastic band.

5. The portable electronic device port cover of claim 4, wherein the adhesive layer between the second elastic band and the third elastic band is not aligned with the adhesive layer between the first elastic band and the second elastic band.

6. The portable electronic device port cover of claim 4, wherein the second adhesive layer between the second elastic band and the third elastic band is aligned with the adhesive layer between the first elastic band and the second elastic band.

7. The portable electronic device port cover of claim 2, further comprising a fastener, to attach the first elastic band and the second elastic band to the portable electronic device.

8. The portable electronic device port cover of claim 2, wherein the elastic band comprises a loop.

9. The portable electronic device port cover of claim 2, wherein the marking is to indicate one of a shape or a type of the port on the portable electronic device.

10. The portable electronic device port cover of claim 2, wherein at least one of the first elastic band and the second elastic band have a tapered side to move aside the first elastic band or the second elastic band as the connector is inserted.

* * * * *